(12) United States Patent
Austin

(10) Patent No.: US 9,579,556 B2
(45) Date of Patent: Feb. 28, 2017

(54) APPARATUS FOR MEASURING JUMP DISTANCES

(71) Applicant: Stephen Austin, Newport Beach, CA (US)

(72) Inventor: Stephen Austin, Newport Beach, CA (US)

( * ) Notice: Subject to any disclaimer, the term of this patent is extended or adjusted under 35 U.S.C. 154(b) by 145 days.

(21) Appl. No.: 14/514,934

(22) Filed: Oct. 15, 2014

(65) Prior Publication Data

US 2016/0109218 A1    Apr. 21, 2016

(51) Int. Cl.
| | | |
|---|---|---|
| G01B 3/20 | (2006.01) | |
| A63B 71/06 | (2006.01) | |
| G01B 5/14 | (2006.01) | |
| G02B 27/20 | (2006.01) | |

(52) U.S. Cl.
CPC ............ *A63B 71/0605* (2013.01); *G01B 3/20* (2013.01); *G01B 5/14* (2013.01); *G02B 27/20* (2013.01)

(58) Field of Classification Search
CPC . G01B 11/26; G01B 3/20; G01B 5/14; G01C 15/00; A63B 71/0605
USPC ............................................ 33/289, DIG. 21
See application file for complete search history.

(56) References Cited

U.S. PATENT DOCUMENTS

| | | | |
|---|---|---|---|
| 5,294,912 A | 3/1994 | Bednarz et al. | |
| 5,520,595 A | 5/1996 | Lee | |
| 6,095,928 A | 8/2000 | Goszyk | |
| 6,714,284 B2 * | 3/2004 | Norman | G01C 15/002 273/317 |
| 6,907,840 B1 | 6/2005 | Gaines | |
| 7,110,092 B2 | 9/2006 | Kasper et al. | |
| 7,185,439 B1 * | 3/2007 | Nubin | G01S 5/02 33/289 |
| 7,219,437 B2 * | 5/2007 | Dallman | B42F 9/002 33/18.2 |
| 7,231,834 B2 | 6/2007 | Kurono | |
| 7,469,480 B2 * | 12/2008 | Nottingham | G01C 15/002 33/286 |
| 7,604,570 B2 | 10/2009 | Wilkins et al. | |
| 7,770,297 B1 * | 8/2010 | Sommerfeld | A63B 24/0021 33/289 |
| 7,797,846 B2 * | 9/2010 | Walser | A63C 19/06 33/289 |
| 8,387,266 B2 * | 3/2013 | Eddy | A61H 9/0078 33/512 |
| 8,690,715 B2 * | 4/2014 | Vogt | A63C 19/065 33/289 |
| 8,713,808 B2 | 5/2014 | Amron | |
| 8,966,776 B2 * | 3/2015 | Kelly | G01C 15/12 33/286 |

(Continued)

*Primary Examiner* — Yaritza Guadalupe-McCall
(74) *Attorney, Agent, or Firm* — Egbert Law Offices, PLLC

(57) ABSTRACT

An apparatus for measuring jump distances has a housing with a bottom surface, a track extending longitudinally along the housing, a carriage translatably affixed to the track, and a laser mounted to the carriage so as to direct the beam in a direction away from the housing. A scale is affixed to or adjacent to the track. The scale has distance indicia formed therein. The carriage has an indicator thereon that is directed to the scale such that the distance indicia corresponding to the indicator corresponds to a location of a surface to which the beam of the laser is directed.

18 Claims, 5 Drawing Sheets

(56) References Cited

U.S. PATENT DOCUMENTS

2006/0168828 A1* 8/2006 Dallman ................. B42F 9/004
                                                    33/286
2007/0271801 A1* 11/2007 Campagna ........... G01C 15/004
                                                    33/286
2016/0109218 A1* 4/2016 Austin ............... A63B 71/0605
                                                    33/275 R

* cited by examiner

APPARATUS FOR MEASURING JUMP DISTANCES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to jumping activities, such as a long jump, a standing broad jump, a triple jump, and similar jumps. More particularly, the present invention relates to devices that are utilized for the measurement of the length of the jump. Additionally, the present invention relates to devices for use in association with jumping activities whereby a jump pit is utilized by the jumper.

2. Description of Related Art Including Information Disclosed Under 37 CFR 1.97 and 37 CFR 1.98

A variety of jumping activities commonly occur at track meets and similar events. These jumping activities can be a long jump, a standing broad jump, or a triple jump. In the case of the long jump and the triple jump, a runner will run down the runway and jump at a marker board at the entry end of a jump pit. The jumper will eventually land in the jump pit so as to displace granular material within the jump pit. At the location where the jump is terminated, a measurement is necessary so as to determine the distance of the jump. Typically, this measurement will occur at the rearward end of the area in which the granular material is displaced. As such, the length of the jump will be measured between the jump line and the divot created in the sand of the jump pit.

In the past, the measurement of this distance has been conducted through the use of a tape measure. One end of the tape measure is positioned at the jump line or foul line. The other end of the tape measure is moved so as to correspond with the end edge of the divot in the sand. As such, the length of the jump can be calculated. This tape measuring of the jump is time-consuming and filled with inaccuracies. First, an accurate tape measure is required to be initially positioned at the foul line. When the line is extended, it may extend have an angle that is not directly transverse to the jump line. As such, the tape measure may have a small angular offset from its intended direction. This can serve to inaccurately lengthen the jump measurement. In other circumstances, the end of the tape adjacent to the divot created by the landing will be positioned forward of or rearward of the actual endpoint of this divot. Once again, inaccuracies can be created. Under other circumstances, the tape measure may have a certain degree of elasticity. As such, this elasticity can change the desired measurement of the jump. As such, a need has developed so as to very accurately and reliably determine the length of the jump.

In the past, various patents have issued relating to laser devices or measurement devices associated with jumping activities. For example, U.S. Pat. No. 5,294,912, issued on Mar. 15, 1994 to Bednarz et al., shows a long jump and triple jump foul detector system. A laser beam is emitted parallel to and directly above the foul line. A laser beam detector detects the interruption of the laser beam by the athlete's shoe. A foul detector provides a foul indication. The system distinguishes between a relatively quick interruption of the beam caused by the athlete's shoe when jumping and a relatively slow interruption of the beam which may result such as by the judge placing his or her hand in the beam when measuring a jump.

U.S. Pat. No. 5,520,595, issued a May 28, 1996 to A. W. Lee, shows a training device for ice skating jumping. A beam of an electromagnetic wave is suspended at an adjustable distance above a floor or an ice surface by a mechanism that generates electromagnetic wave energy and detects that same energy bounced back from a reflector plate placed a distance apart from the generator source. The beam of the electromagnetic transmission is suspended across the distance between the transceiver and reflector so as to keep an electric switch open and an electric alarm disabled or silent. Whenever the invisible beam is broken or cut by any obstruction, such as a skater's boot or leg, the alarm mechanism is energized and signal an interruption.

U.S. Pat. No. 6,095,928, issued on Aug. 1, 2000 to K. A. Goszyk, discloses a three-dimensional object path tracking device. This captures the path of an object moving through a sensing volume determined by a three-dimensional coordinate system. First, second and third angle detectors are mounted in a common housing positionable at a vortex of a sensing cone encompassing the sensing volume. The detectors are separated from one another by known fixed distances. Each detector receives a respective light beam from the object having a respective angle relative to a respective reference line of the three-dimensional coordinate system so as to provide a signal corresponding to the respective angle.

U.S. Pat. No. 6,714,284, issued on Mar. 30, 2004 to Norman et al., shows a track and field measuring apparatus and method. In particular, this is applied to a throwing event at a track-and-field meet. The device is set in a position outside of a throwing circle and a landing area for the event being measured and is aimed at a target placed at a landing position of a thrown object. This method utilizes a laser distance measuring device to determine the height of a crossbar in a leaping event at a track-and-field meet.

U.S. Pat. No. 6,907,840, issued on Jun. 21, 2005 to M. A. Gaines, describes a football first down indicator system. The first down indicator system includes a pair of first down marker members each having an elongate housing member and also having a stub shaft attached to a bottom of the elongate housing member for resting upon the ground. A down display housing is attached to the top of the elongate housing member. A plurality of number displays are rotatably disposed in each down display housing.

U.S. Pat. No. 7,110,092, issued on Sep. 19, 2006 to Kasper et al., shows a measuring device and measuring method for determining distance and/or position. The measuring device is provided with a signal generator and a signal receiver. The signal receiver is located at a measurable distance from the signal generator. The signal generator is designed for the emission of at least two signal beams covering an area. The signal receiver is designed for the time-resolved the reception of the signal beams in such a manner that the generator-receiver distance can be determined from the time signature of the signal beam reception.

U.S. Pat. No. 7,231,834, issued on Jun. 19, 2007 to T. Kurono, teaches a stride measuring apparatus in which a signal wave emitter and a signal wave detector are opposed to each other in a direction intersecting with a predetermined direction in which the running surface is driven. The signal wave emitter emits a light beam. The signal wave detector outputs an ON signal when receiving the light beam, and outputs an OFF signal when the light beam is intercepted. A detector calculates a moving speed on the basis of a definite difference between a fall time and a rise time of one OFF signal out of two OFF signals outputted in succession from the signal wave detector.

U.S. Pat. No. 7,604,570, issued on Oct. 20, 2009 to Wilkins et al., provides an exercise device having a position verification feedback. The exercise device includes a base unit defining a support surface, at least two position sensors arranged along a sensing plane relative to the support surface for detecting the presence of the user upon the sensing plane, and a controller in communication with the position sensors to determine the user's position relative to the sensing plane.

U.S. Pat. No. 8,713,808, issued on May 6, 2014 to A. Amron, describes a system and method for projecting a visible line on an athletic field surface. The temporary line projection system is designed to be grasped by hand and moved, by a single human operator, into a desired location, such as along the sidelines of a football field adjacent to where a first down line is to be projected. The system includes a movable structure that is dimensioned and arranged to be supported by and projected upwardly from an athletic field surface. A laser source is supported by the movable structure and is maintained by the movable structure at an elevated location relative to the athletic field surface. This allows the laser source to direct optical energy downward upon the field while the movable structure is maintained substantially in a first orientation relative to the athletic field surface.

It is object of the present invention to provide an apparatus for measuring jump distances that is usable on any surface.

It is another object of the present invention to provide an apparatus for measuring jump distances that has great accuracy.

It is still another object of the present invention provide an apparatus for measuring jump distances which promotes better competition.

It is a further object of the present invention to provide an apparatus for measuring jump distances that provides uniformly accurate results.

It is a further object of the present invention provide an apparatus for measuring jump distances that allows the operator to sit comfortably in a location adjacent to the jump pit.

It is another object of the present invention to provide an apparatus for measuring jump distances that serves to promote sponsor brand identity.

It is a further object of the present invention to provide an apparatus for measuring jump distances that is usable with standard measuring tape.

It is a further object of the present invention to provide an apparatus for measuring jump distances that is easy to assemble with simple tools.

It is a further object of the present invention to provide an apparatus for measuring jump distances that does not require calibration.

These and other objects and advantages of the present invention will become apparent from a reading of the attached specification and appended claims.

BRIEF SUMMARY OF THE INVENTION

The present invention is an apparatus for measuring jump distances that comprises a housing having a bottom surface, a track extending longitudinally along the housing, a carriage translatably affixed to the housing, and a laser mounted to the carriage so as to direct a beam in a direction away from the housing.

In the present invention, a scale is affixed to or adjacent to the track. The scale has distance indicia formed thereon. The carriage has an indicator thereon. This indicator is directed toward the scale such that the distance indicia corresponded to the indicator corresponds to a location of a surface to which the beam of the laser is directed. The laser is mounted to the carriage so as to be pivotable in a plane transverse to the longitudinal axis of the carriage. The laser is mounted so as to be fixed with respect to the carriage. The track is positioned so as to extend along an upper portion of the housing.

In the present invention, the housing includes a pair of side panels and a front panel extending between the pair of side panels. Each of the pair of side panels has a flange at a bottom surface thereof. The flange defines the bottom surface of the housing. The flange will extend transverse to the side panel. The laser is positioned above the front panel. The track will extend between the pair of side panels. The front panel has a forward surface suitable for the display of an advertisement thereon. Each of the pair of side panels has an outer surface suitable for the display of advertising indicia thereon. At least one of the pairs of side panels has a notch formed therein. This notch is suitable for receiving a tape measure therein.

In the present invention, the carriage includes a body having a bracket. This bracket is suitable for receiving the track therein. A pair of surfaces extend upwardly from the body in spaced parallel relationship to each other. A holder is pivotally mounted between the pair of surfaces. The holder removably receives the laser therein. A laser is affixed to the body of the carriage and extends outwardly therefrom in a direction away from the laser.

The present the present invention further includes a longitudinal member that has a line with one end connected thereto. The line has another end affixed to the carriage or to the laser. The longitudinal member is suitable for placement so as to indicate an intended target of the jump.

In normal use, the housing is placed along a side of the jump pit. A tape member will extend from the entry end of the jump pit and have another end received by the slot of the side panel. As such, the housing can be placed at an accurate foot or meter of the tape measure. The scale on the housing will have a zero location corresponding to the foot or meter marking of the tape. As such, as the carriage is positioned along the track, the indicator will be directed to the scale so as to allow for the simple and addition to the foot or meter measurement of the tape. After the completion of the jump, the laser can be directed toward the rear end of the divot created in the granular material of the jump pit. As such, a small laser spot will be directed toward the trailing end of the completed jump. Since the laser corresponds with the indicator on the carriage, the distance indicia on the scale that is marked by the indicator can be added to the foot or meter measurement of the tape so as to give an accurate measurement of the distance of the jump.

This foregoing Section is intended to describe, with particularity, the preferred embodiments of the present invention. It is understood that modifications to these preferred embodiments can be made within the scope of the present invention without departing from the true spirit of the invention. As such, this Section is not intended, in any way, to be limiting of the broad scope of the present invention. The present invention should only be limited by the following claims and their legal equivalents.

DETAILED DESCRIPTION OF THE INVENTION

Figure 1:
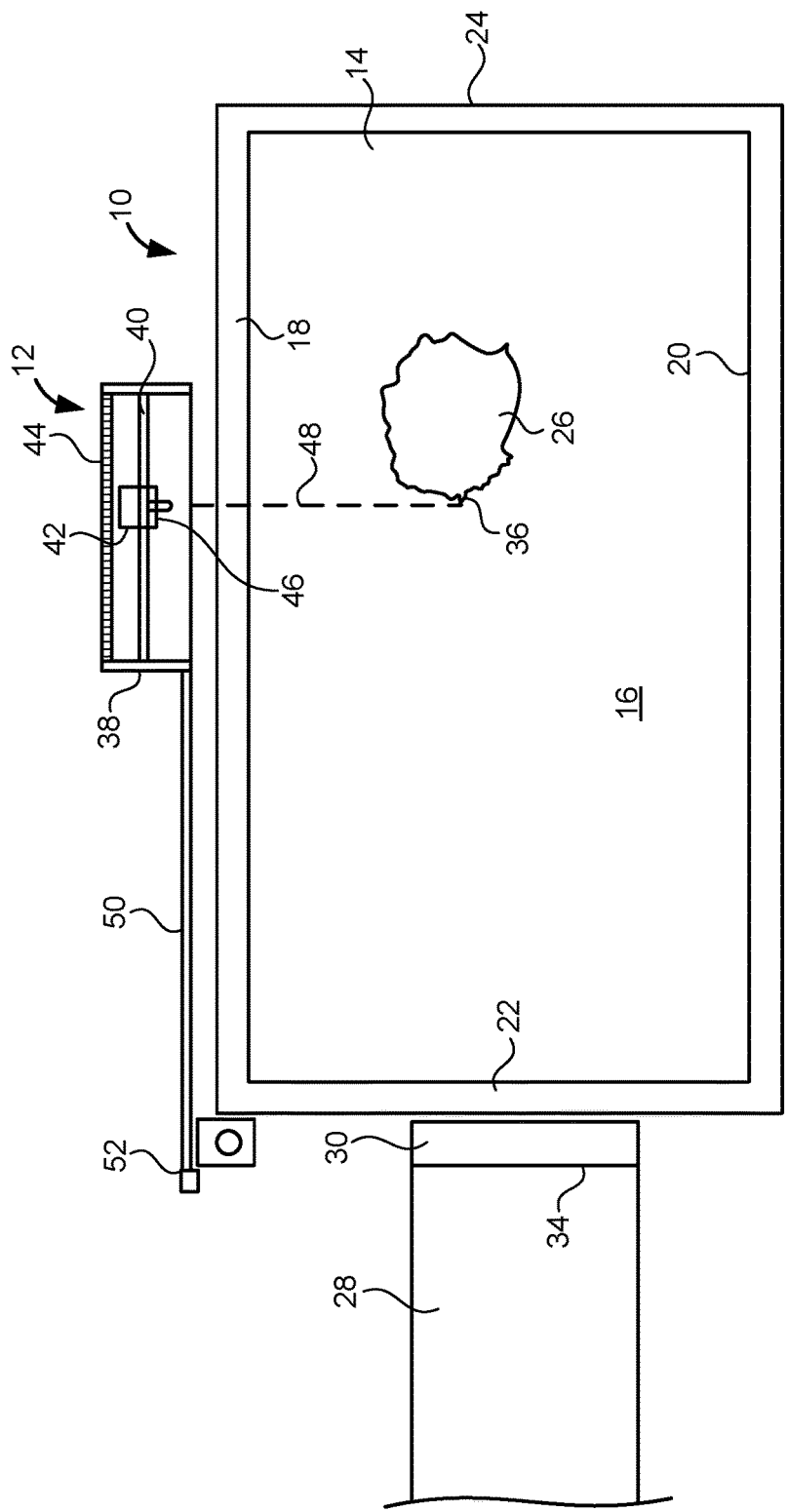
FIG. 1 is a plan view showing the application of the apparatus the present invention in association with a long jump pit.

Referring to FIG. 1, there is shown the jump measurement system 10 that employs the distance measurement apparatus 12 of the present invention. The jump measurement system 10 includes a jump pit 14 having a granular material 16 therein. The jump pit 14 includes a pair of sides 18 and 20, an entry end 22 and an opposite end 24. As can be seen in FIG. 1, there is a divot 26 that has been formed in the granular material 16 as a result of a jump. A runway 28 extends so as to have a foul line 30 adjacent to the entry end 22 of the jump pit 14. In normal use, a jumper will run along the runway 28 and jump prior to passing a plane extending upwardly from the foul line 30. The jumper will fly through the air until the jumper lands in the jump pit 14 so as to create the divot 26 within the granular material 16. The distance of the jump is measured from the edge 34 of the foul line 30 and the trailing end 36 of the divot 26.

The measurement device apparatus 12 the present invention includes a housing 38 that is positioned in generally parallel relationship to the side 18 of the jump pit 14. The measurement apparatus 12 includes a track 40 that also will extend in generally parallel relationship to the side 18 of the jump pit 14. A carriage 42 is translatably mounted upon the track 40 so as to be slidable from one end to another end of the measurement apparatus 12. A scale 44 is positioned in proximity to the carriage 42. The carriage 42, as will be described hereinafter, can have an indicator thereon so that the location of the carriage 42 will correspond to a location along the scale 44. A laser 46 is mounted to the carriage 42. The laser 46 is capable of projecting a beam 48 (illustrated in broken line fashion) toward the divot 26. The indicator on the carriage 42 will be aligned with the beam 48. As such, the location on the scale 44 will correspond to the location of the beam 48.

In FIG. 1, it can be seen that the beam 48 is directed toward the trailing end 36 of the divot 26. As such, the indicator on the carriage 42 corresponds to a distance indicia on the scale 44. A tape measure 50 has an end 52 positioned so as to correspond to the foul line 30 and, in particular, to the edge 34 of the foul line 30. The tape measure 50 will extend in generally parallel relationship to the side 18 of the jump pit 40. The hooked end of the tape measure 50 will be received within a notch formed in the housing 38 of the measurement apparatus 12.

In normal use, the measurement apparatus 12 will be generally positioned in a location corresponding to the area of completed jumps by the various participants in the long jump, broad jump or triple jump event. The measurement apparatus 12 has a substantial length, in the order of five feet. As such, the measurement apparatus 12 should be able to span the anticipated range of completed jumps. The tape measure 50 can be extended for a distance. The tape measure 50 will be indicative of feet or meters. As such, if jumps are expected in the range of 17 to 22 feet, then the tape measure 50 can be extended so as to be at 17 feet. As a result, the scale 44 will cover the range from between 17 and 22 feet. The numerical distance indicia on the scale 44 can be added to the distance of the tape measure 50 so as to provide a quick and easy calculation of the completed jump distance.

Figure 2:
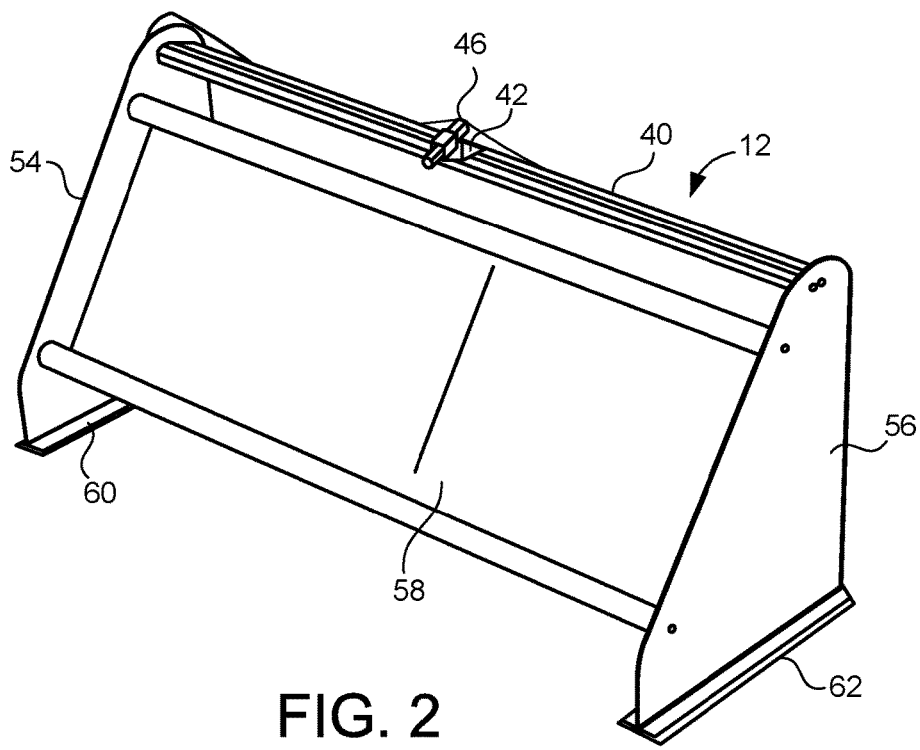
FIG. 2 is an upper perspective view of the apparatus of the present invention.

FIG. 2 shows the distance measurement apparatus 12 of the present invention. The distance measurement apparatus 12 includes a first side panel 54 and a second side panel 56. A front panel 58 is affixed to the side panels 54 and 56 and extends therebetween. It can be seen that the front panel 38 includes a frontal surface suitable for the display of advertising thereon. Similarly, the outer surfaces of the side panels 54 and 56 will also be available for placement of advertising thereon. The side panel 54 includes a base 60 located at a bottom thereof. Similarly, the side panel 56 includes a base 62 located at the bottom thereof. Each of the side panels 54 and 56 has a relatively wide bottom in comparison to the relatively narrow top. The bottom surfaces 60 and 62 of each of the side panels 54 and 56 provides a very sturdy support of the measurement apparatus 10 upon an underlying surface adjacent to the jump pit.

In FIG. 2, it can be seen that the track 40 extends in a location above the front panel 58 and extends between the side panels 54 and 56. As such, the track 40 will cover the entire distance spanned by the measurement apparatus 12. The carriage 42 is translatably mounted on the track 40. The carriage 42 will receive the laser 46 thereon. It can be seen that the laser 46 is directed at an angle downwardly. As such, the laser spot created by the laser beam 48, as projected from the laser 46, can be aligned with the trailing end 36 of the divot 26.

Figure 3:
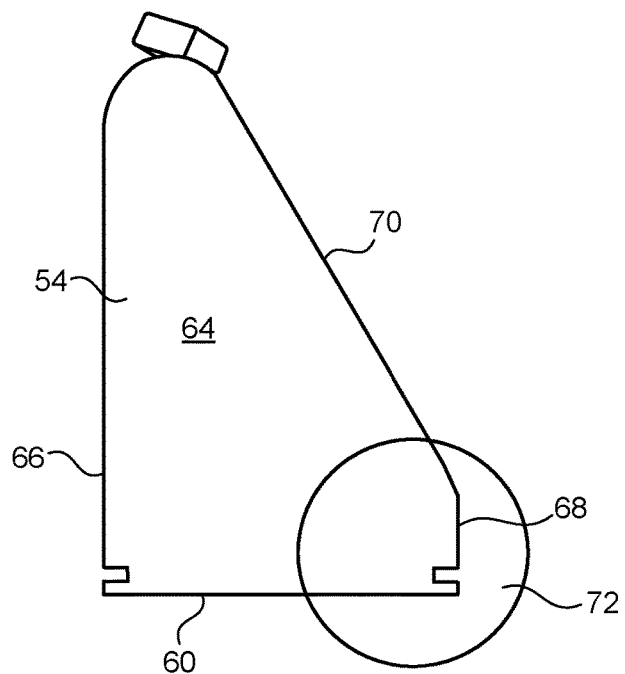
FIG. 3 is a side elevational view of the apparatus of the present invention.
Figure 4:
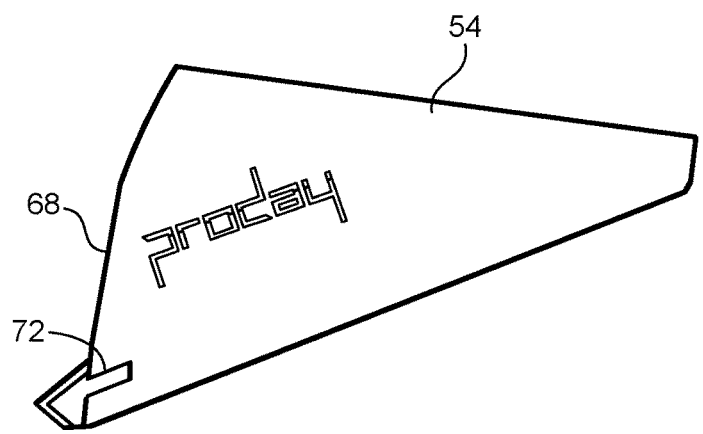
FIG. 4 is a detailed view showing the circled area of FIG. 3.

FIG. 3 illustrates the side panel 54. Side panel 54 includes a surface 64 thereon. Surface 64 allows a variety of advertising to be placed thereon. Surface 64 is a generally planar surface that extends in a vertical plane. The side panel 54 includes a rear edge 66 and a forward edge 68. An angled edge 70 extends from the upper end of the forward edge 68 upwardly toward the upper end of the side panel 54. Importantly, a notch 72 is formed inwardly of the forward edge 68 adjacent to the bottom surface 60 of the panel 54. Notch 72 is suitable for receiving the hooked end of the tape measure therein. The notch 72 should be placed as close as practicable to the bottom surface 60 so as to avoid any errors that could occur from an angled orientation of the tape measure 50.

FIG. 2 shows, in particular, the arrangement of the notch 72 as formed in the forward edge 68 at the bottom of the panel 54. In normal use, when setting up the measuring apparatus 12 of the present invention, the user will place the hooked end of the tape measure into the slot 72. The user can then extend the tape measure outwardly such that the body of the housing of the tape measure can be located adjacent to the edge 34 of the foul line 30.

Figure 5:
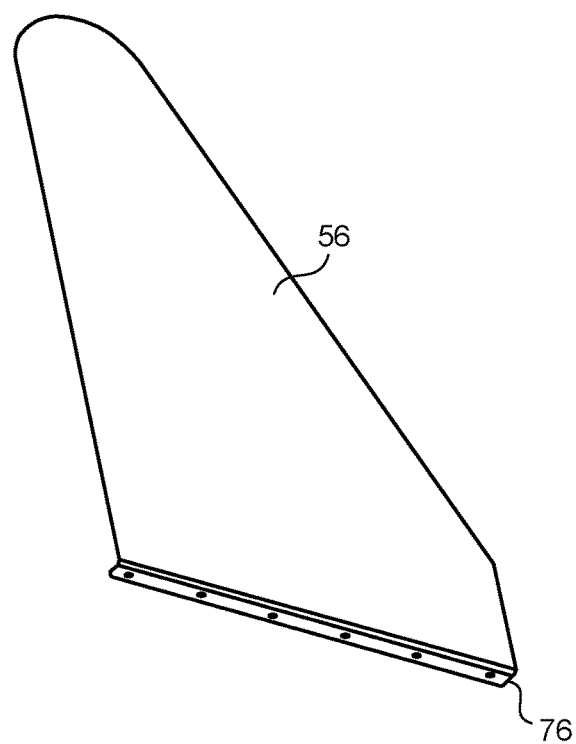
FIG. 5 is a perspective view showing a side panel as used in the apparatus of the present invention.

FIG. 5 is an inner view of the side panel 56. The side panel 56 include suitable holes formed therethrough. Importantly, a small flange 76 is formed at the bottom of the panel 56. Flange 76 is bent inwardly. Another panel, similar to panels 56 can be placed against panel 56 such that the flange at the bottom thereof will extend outwardly in an opposite direction. As such, the relatively wide area of the bottom surface 62 of panel 56 is formed.

Figure 6:
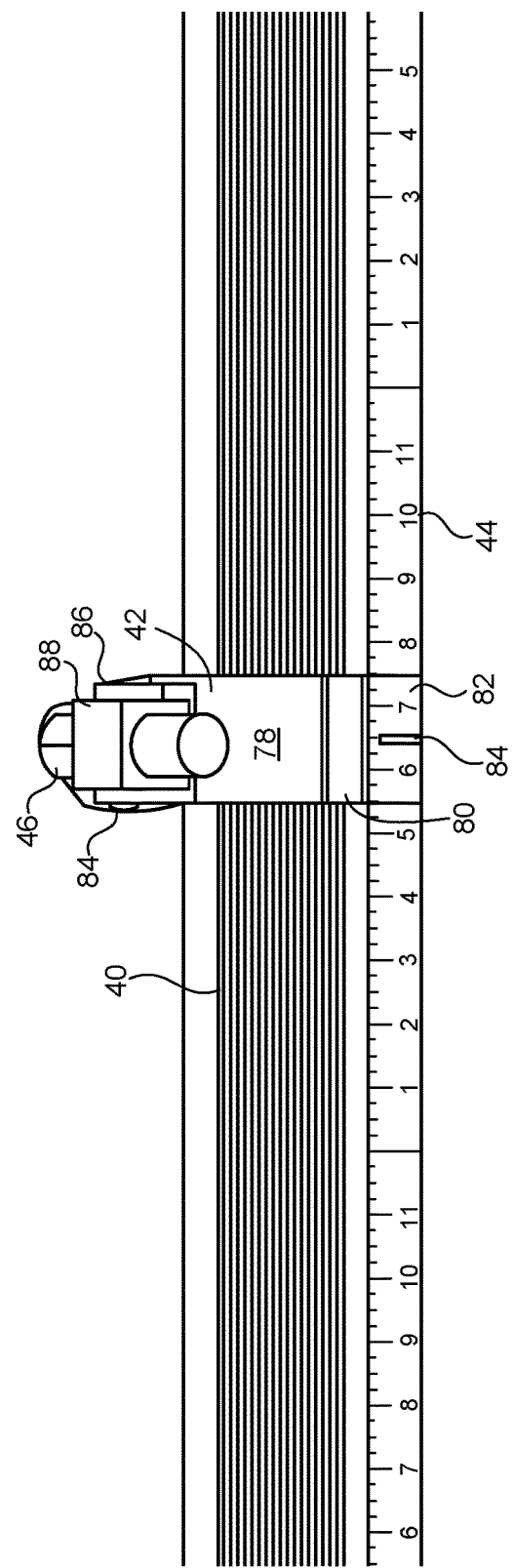
FIG. 6 is a plan view showing the relationship between the laser, the carriage, and the scale associated with the track of the present invention.

FIG. 6 shows how the carriage 42 is translatably positioned on the track 40. In particular, the carriage 42 includes a body 78 that has a bracket 80 formed thereon. Bracket 80 will extend around the track 40 so as to retain the body 78 thereon. An indicator 82 extends outwardly of the body 74. Indicator 82 includes a marker line 84 that is directed toward the scale 44. In FIG. 6, it can be seen that the indicator 82 is of a transparent nature. The indicator line 84 is formed on this transparent indicator 82. However, within the concept of the present invention, a pointer, or similar element, can extend outwardly of the body 78 so as to correspond with the scale 44.

The body 78 includes a pair of surfaces 84 and 86 extending upwardly in spaced parallel relationship to each other. A holder 88 is positioned between the surfaces 84 and 86. The laser 46 is removably received within the holder 88. In the configuration shown in FIG. 6, the holder 88 will be pivotably mounted between the surfaces 84 and 86. As a result, the laser 46 is pivotally movable in a plane transverse to the track 40. So as to assure that the laser 46 is always aligned in transverse relationship to the track 40, the arrangement of the surfaces 84 and 86 prevents in a pivotal movement of the laser 46 horizontally. As such, the orientation of laser 46 will always be fixed with respect to the body 78 of the carriage 42.

Figure 7:
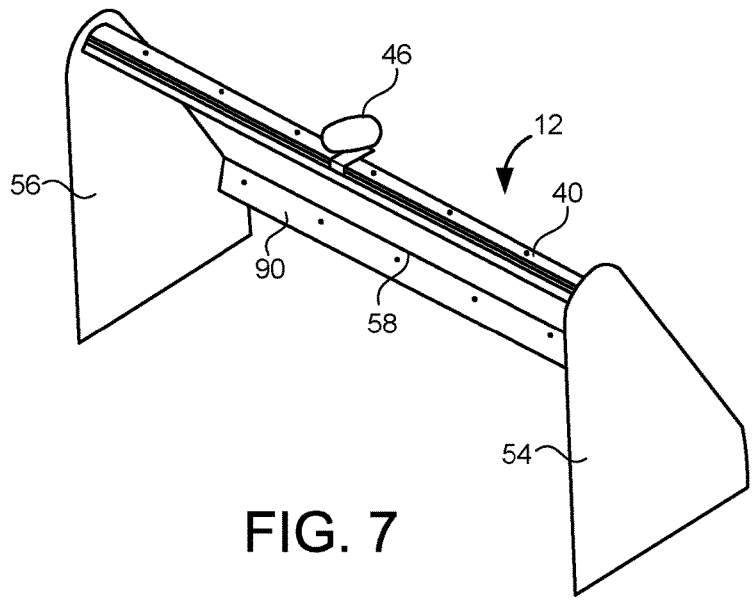
FIG. 7 is a rear upper perspective view showing the apparatus of the present invention.

FIG. 7 shows a rear view of the measurement apparatus 12 of the present invention. In FIG. 7, it can be seen that the front panel 58 has a generally planar configuration with a small inwardly bent lower surface 90 and an inwardly bent upper surface. The bending of the lower surface 90 in the upper surface (not illustrated), enhances the structural integrity of the front panel 50 and the rigid connection of the front panel 58 with respect to the side panels 54 and 56. The laser 46 is illustrated as mounted to the track 40 and is directed downwardly. It can be seen in FIG. 7 that the measurement apparatus 12 of the present invention provides a comfortable area therebehind whereby an operator can easily and comfortably sit during the measurement activities.

Figure 8:
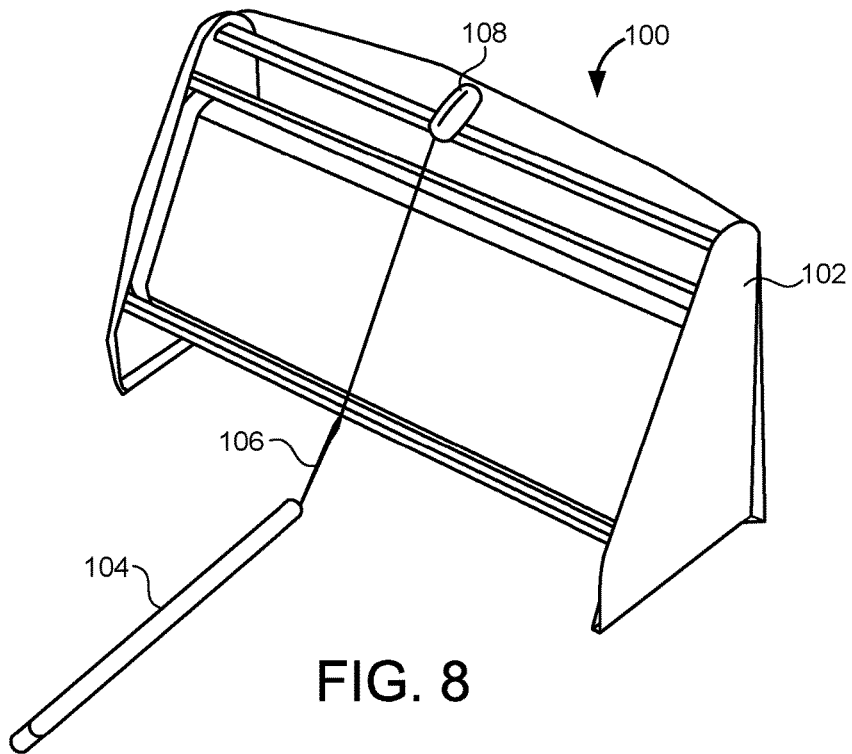
FIG. 8 is a frontal upper perspective view of an alternative embodiment of the apparatus of the present invention.

FIG. 8 shows an alternative embodiment of the measurement apparatus 100 of the present invention. The housing 102 of the measurement apparatus 100 is identical to the configuration shown in FIG. 2 herein. Importantly, in FIG. 8, it can be seen that there is a longitudinal member 104 that is connected by a line 106 to the laser 108 (or to the carriage upon which the laser 108 is connected). The embodiment of FIG. 8 allows for intended goals of jumps to be marked. In other words, if the jumper intends to achieve a particular target, the laser 108 can be directed to a measured location in the granular material within the jump pit. The line 106 and the longitudinal member 104 can be extended outwardly so as to reside at this intended goal. As such, the jumper will have a visual indication of his or her intended goal. Longitudinal member 104 can remain in place during the jump or can be simply used to mark a position within the granular material. As a result, the embodiment 100 of the measurement apparatus the present invention can be utilized during training activities for facilitating the ability of the jumper to achieve his or her goals.

The present invention is a significant improvement over prior art techniques for measuring jumps. In particular, in the present invention, the housing is positioned over an entire area of expected jump completions. As such, the measurement apparatus can remain in place during the entire track-and-field activity. As such, measurements throughout the jumping event will be consistent. The accurate placement of the jump measurement apparatus is achieved by the relationship between the measuring tape and the housing. After a proper measurement has taken place, the measuring tape can be removed and used for other purposes. As soon as soon as the jump is completed, the laser can be moved along the track such that the laser spot is positioned at the trailing end of the divot created following the jump. As such, the measurement on the scale of the measurement apparatus can be added to the distance of the tape measure so as to immediately produce a result. The present invention avoids the need for extending the tape measure after each jump, aligning the tape measure to be generally perpendicular to the foul line, and then calculating the measurement from the tape measure. The present invention avoids any problems created by the elasticity of the measuring tape since the measurement apparatus will remain in place during the jumping activities. Any problems associated with angular offsets caused by the measuring tape are avoided since the measuring tape is not used after the apparatus is installed. As such, the present invention is able to properly measure jumps in an accurate and efficient manner.

In the present invention, it is important to note that each of the side panels can include a slot for receiving the tape measure therein. Within the concept of the present invention, the tape measure can be placed in a slot of one of the side panels and extends so as to reside within the slot of the other side panel. As such, a very accurate alignment is achieved between the tape measure and the housing of the present invention. Additionally, the parallel relationship between the measurement apparatus and the side of the jump pit is enhanced. This further leads to accuracies in the measure of jumps.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for measuring jump distances, the apparatus comprising:
    a housing having a bottom surface, said housing having a pair of side panels and a front panel extending between said pair of side panels, each of said pair of side panels having a flange at a bottom thereof, said flange defining said bottom surface of said housing, said flange extending transverse to the side panel;
    a track extending longitudinally along said housing;
    a carriage translatably the affixed to said track; and a laser mounted to said carriage so as to direct a beam in a direction away from said housing.

2. The apparatus of claim 1, further comprising:
a scale affixed to or adjacent to said track, said scale having distance indicia formed thereon.

3. The apparatus of claim 2, said carriage having an indicator thereon, said indicator directed toward said scale such that the distance indicia corresponding to said indicator corresponds to a location of a surface to which the beam of said laser is directed.

4. The apparatus of claim 1, said laser mounted to said carriage so as to be pivotable in a plane transverse to said longitudinal axis of said track.

5. The apparatus of claim 4, said laser being mounted so as to be in a fixed position with respect to said carriage.

6. The apparatus of claim 1, said track positioned so as to extend along an upper portion of said housing.

7. The apparatus of claim 1, said laser positioned above said front panel, said track extending between said pair of side panels.

8. The apparatus of claim 1, said front panel having a forward surface suitable for display of an advertisement thereon, each of said pair of side panels having an outer surface suitable for the display of advertising indicia thereon.

9. The apparatus of claim 1, at least one of said pair of side panels having a notch formed therein, said notch suitable for receiving a portion of a tape measure therein.

10. An apparatus for measuring jump distances, the apparatus comprising:
a housing having a bottom surface;
a track extending longitudinally along said housing;
a carriage translatably the affixed to said track; and
a laser mounted to said carriage so as to direct a beam in a direction away from said housing, said carriage comprising:
a body having a bracket, said bracket receiving said track therein;
a pair of surfaces extending upwardly from said body in spaced parallel relation to each other; and
a holder pivotally mounted between said pair of surfaces, said holder removably receiving said laser therein.

11. The apparatus of claim 10, further comprising:
an indicator affixed to said body and extending outwardly therefrom in a direction away from said laser.

12. The apparatus of claim 10, further comprising:
a longitudinal member; and
a line having one end connected to said longitudinal member, said line having another end affixed to said carriage or to said laser, said longitudinal member suitable for placement so as to indicate an intended target of the jump.

13. An apparatus comprising:
a jump pit having a granular material therein, said jump having at least one side and an entry end; and
a distance measurement device removably positioned adjacent to the side and forward of said entry end of said jump pit, the distance measurement device comprising:
a housing having a pair of side panels and a front panel extending between said pair of side panels;
a track extending longitudinally along said housing;
a carriage translatably affixed to said track; and
a laser mounted to said carriage so as to direct a beam in a direction away from said housing and toward the granular material in said jump pit.

14. The apparatus of claim 13, further comprising:
a tape measure extending from said entry end of said jump pit, said tape measure having an end removably affixed at least one of said pair of side panels.

15. The apparatus of claim 13, further comprising:
a scale affixed to or adjacent to said track, said scale having distance indicia formed thereon.

16. The apparatus of claim 15, said carriage having an indicator thereon, said indicator directed toward said scale such that the distance indicia corresponding to said indicator corresponds to a location of a surface to which the beam of said laser is directed.

17. The apparatus of claim 13, said laser mounted to said carriage so as to be pivotable in a plane transverse to said longitudinal axis of said track, said laser mounted to said carriage so as to be fixed in a horizontal position with respect to said carriage.

18. The apparatus of claim 13, further comprising:
a longitudinal member; and
a line having one end connected to said longitudinal member, said line having another end affixed to said carriage or to said laser, said longitudinal member removably positionable on said granular material in said jump pit so as to indicate an intended target of the jump.

* * * * *